United States Patent
Hoang et al.

(10) Patent No.: US 12,216,996 B2
(45) Date of Patent: Feb. 4, 2025

(54) REASONABLE LANGUAGE MODEL LEARNING FOR TEXT GENERATION FROM A KNOWLEDGE GRAPH

(71) Applicant: INTERNATIONAL BUSINESS MACHINES CORPORATION, Armonk, NY (US)

(72) Inventors: Thanh Lam Hoang, Maynooth (IE); Dzung Tien Phan, Pleasantville, NY (US); Gabriele Picco, Dublin (IE); Lam Minh Nguyen, Ossining, NY (US); Vanessa Lopez Garcia, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 17/453,327

(22) Filed: Nov. 2, 2021

(65) Prior Publication Data
US 2023/0134798 A1 May 4, 2023

(51) Int. Cl.
*G06F 40/279* (2020.01)
*G06F 40/30* (2020.01)
*G06F 40/40* (2020.01)
*G06N 5/022* (2023.01)

(52) U.S. Cl.
CPC ............ *G06F 40/279* (2020.01); *G06F 40/30* (2020.01); *G06F 40/40* (2020.01); *G06N 5/022* (2013.01)

(58) Field of Classification Search
CPC ........ G06F 40/279; G06F 40/30; G06F 40/40; G06F 16/3329; G06F 40/56; G06N 5/022; G06N 3/08; G06N 5/02; G06N 7/01; G06N 20/00

USPC .......................................................... 704/9
See application file for complete search history.

(56) References Cited

U.S. PATENT DOCUMENTS

| | | |
|---|---|---|
| 9,514,740 B2 | 12/2016 | Jost et al. |
| 9,679,558 B2 | 6/2017 | Akbacak et al. |
| 9,997,157 B2* | 6/2018 | Akbacak .............. G06F 16/637 |
| 10,073,840 B2 | 9/2018 | Hakkani-Tur et al. |
| 10,191,999 B2* | 1/2019 | Liu .......................... G06F 40/30 |
| 10,192,545 B2 | 1/2019 | Levit et al. |
| 2016/0328253 A1* | 11/2016 | Majumdar ............. G06N 10/00 |
| 2017/0228402 A1* | 8/2017 | Kumar .................. G06F 16/215 |

(Continued)

FOREIGN PATENT DOCUMENTS

| | | |
|---|---|---|
| CN | 110442675 A | 11/2019 |
| CN | 110765235 A | 2/2020 |
| WO | 202112519 A1 | 1/2021 |

OTHER PUBLICATIONS

Cour et al., "Learning from Partial Labels", Journal of Machine Learning Research 12, 2011, (pp. 36).

(Continued)

*Primary Examiner* — Paras D Shah
*Assistant Examiner* — Fouzia Hye Solaiman
(74) *Attorney, Agent, or Firm* — Stephen R. Yoder

(57) ABSTRACT

Embodiments are provided for generating a reasonable language model learning for text data in a knowledge graph in a computing system by a processor. One or more data sources and one or more triples may be analyzed from a knowledge graph. Training data having one or more candidate labels associated with one or more of the triples may be generated. One or more reasonable language models may be trained based on the training data.

20 Claims, 9 Drawing Sheets

(56) References Cited

U.S. PATENT DOCUMENTS

| | | | | |
|---|---|---|---|---|
| 2019/0354544 | A1* | 11/2019 | Hertz | G06N 5/025 |
| 2020/0042600 | A1 | 2/2020 | Anisimovich et al. | |
| 2020/0042642 | A1* | 2/2020 | Bakis | G06F 40/35 |
| 2021/0042344 | A1* | 2/2021 | Hu | G06N 3/08 |
| 2021/0264244 | A1* | 8/2021 | Xian | G06F 16/221 |
| 2022/0092443 | A1* | 3/2022 | Seyot | G06F 40/295 |
| 2022/0156594 | A1* | 5/2022 | Hoang | G06N 3/088 |
| 2022/0230625 | A1* | 7/2022 | Zhu | G10L 15/063 |
| 2023/0100376 | A1* | 3/2023 | Liu | G06F 40/30 704/9 |

OTHER PUBLICATIONS

Hullermeier et al., "Learning from Ambiguously Labeled Examples", Advances in Intelligent Data Analysis VI. IDA 2005. Lecture Notes in Computer Science, vol. 3646. Springer, Berlin, Heidelberg, https://doi.org/10.1007/11552253_16 (pp. 12).

Zeng et al., "Learning from Associating Ambiguously Labeled Images", IEEE Conference on Computer Vision and Pattern Recognition, Jun. 20-25, 2009, (pp. 8) https://doi.org/10.1109/CVPR.2009.5206667.

Luo et al., "Learning from Candidate Labeling Sets", IDIAP Research Institute, 2011, (pp. 11).

Zhou, Zhi-Hua, "A Brief Introduction to Weakly Supervised Learning", National Key Laboratory for Novel Software Technology, Nanjing University, Nanjing 210023, China, 2017 (pp. 10).

Qu et al., "Weakly-supervised Knowledge Graph Alignment with Adversarial Learning", Montreal Institute for Learning Algorithms (MILA) University of Montreal, arXiv:1907.03179v1, Jul. 6, 2019, (pp. 10).

Logan IV et al., "Barack's Wife Hillary: Using Knowledge Graphs for Fact-Aware Language Modeling", Proceedings of the 57th Annual Meeting of the Association for Computational Linguistics, pp. 5962-5971, Florence, Italy, Jul. 28-Aug. 2, 2019 (pp. 10).

Chisholm et al., "Learning to Generate One-sentence Biographies from Wikidata", arXiv:1702.06235v1, 2017 (pp. 10).

Chen et al., "Enhancing Neural Data-To-Text Generation Models with External Background Knowledge", Proceedings of the 2019 Conference on Empirical Methods in Natural Language Processing and the 9th International Joint Conference on Natural Language Processing, pp. 3022-3032, Hong Kong, China, Nov. 3-7, 2019 (pp. 11).

Vougiouklis et al., "Neural Wikipedian: Generating Textual Summaries from Knowledge Base Triples", arXiv:1711.00155v1, Nov. 1, 2017, (pp. 16).

Elsahar et al., "T-REx: A Large Scale Alignment of Natural Language with Knowledge Base Triples", Proceedings of the Eleventh International Conference on Language Resources and Evaluation (LREC), May 2018, Japan, (pp. 5).

Duma et al., "Generating Natural Language from Linked Data: Unsupervised template extraction", Association for Computational Linguistics, Proceedings of the 10th International Conference on Computational Semantics (IWCS 2013)—Long Papers, Mar. 2013, Germany, (pp. 11).

Wu et al., "Sequential Matching Network: A New Architecture for Multi-turn Response Selection in Retrieval-Based Chatbots", arXiv:1612.01627v2, InProceedings of the 55th Annual Meeting of the Association for Computational Linguistics (vol. 1: Long Papers). vol. 1, pp. 496-505, May 15, 2017, (pp. 10).

Wu et al., "Learning Matching Models with Weak Supervision for Response Selection in Retrieval-based Chatbots", arXiv:1805.02333v2, Association for Computational Linguistics, Proceedings of the 56th Annual Meeting of the Association for Computational Linguistics (vol. 2: Short Papers), Jul. 2018, Australia, (pp. 6).

* cited by examiner

REASONABLE LANGUAGE MODEL LEARNING FOR TEXT GENERATION FROM A KNOWLEDGE GRAPH

BACKGROUND OF THE INVENTION

Field of the Invention

The present invention relates in general to computing systems, and more particularly, to various embodiments for providing a reasonable language model learning for text data in a knowledge graph by a processor.

Description of the Related Art

In today's society, consumers, businesspersons, educators, and others communicate over a wide variety of mediums in real time, across great distances, and many times without boundaries or borders. With the increased usage of computing networks, such as the Internet, humans are currently inundated and overwhelmed with the amount of information available to them from various structured and unstructured sources. Due to the recent advancement of information technology and the growing popularity of the Internet, a wide variety of computer systems have been used in machine learning. Machine learning is a form of artificial intelligence ("AI") that is employed to allow computers to evolve behaviors based on empirical data.

SUMMARY OF THE INVENTION

According to an embodiment of the present invention, a method for providing a reasonable language model learning for text data in a knowledge graph in a computing environment, by one or more processors, is depicted. One or more data sources and one or more triples may be analyzed from a knowledge graph. Training data having one or more candidate labels associated with one or more of the triples may be generated. One or more reasonable language models may be trained based on the training data.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

Thus, in addition to the foregoing exemplary method embodiments, other exemplary system and computer product embodiments are provided.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
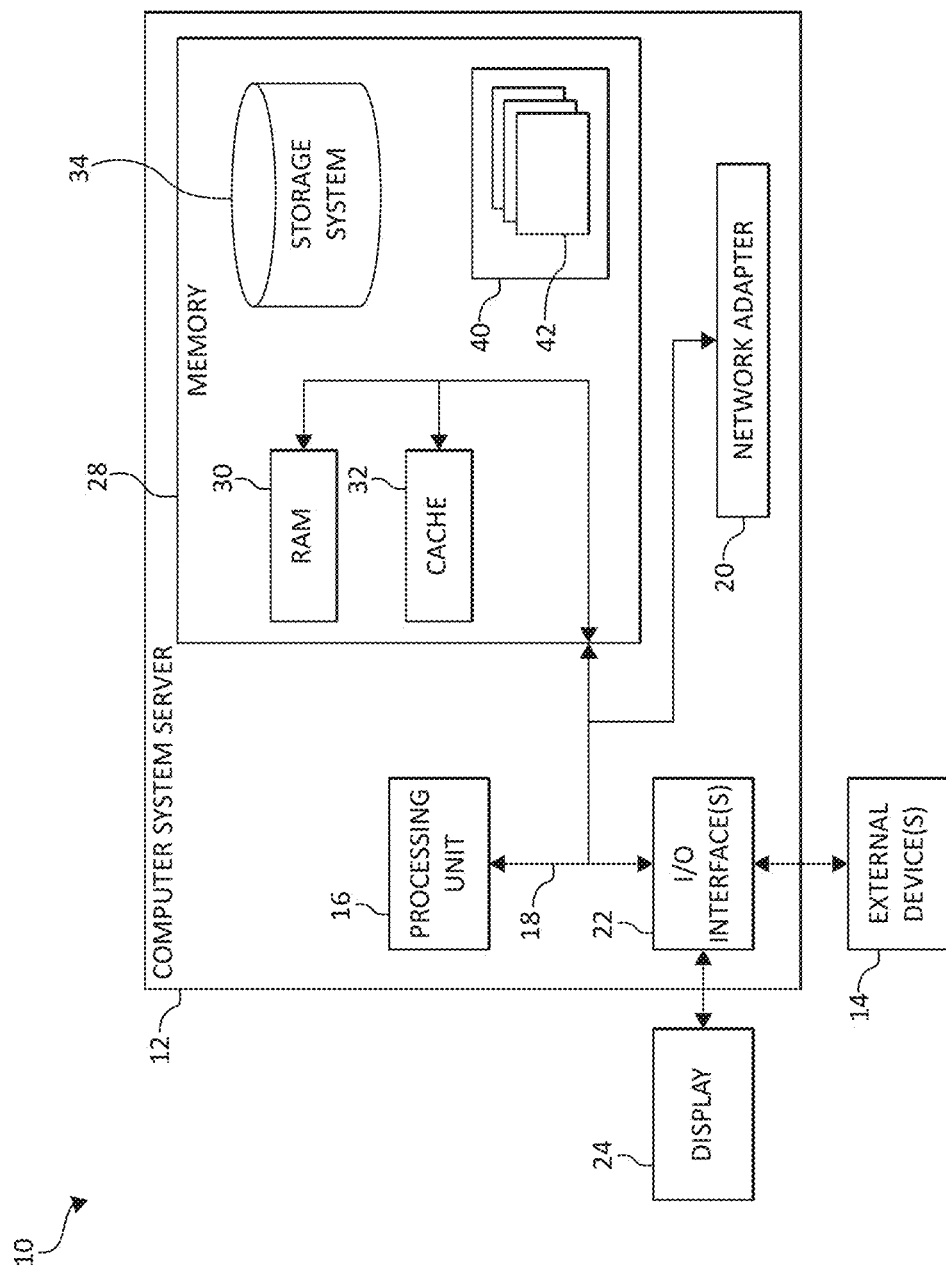
FIG. 1 is a block diagram depicting an exemplary cloud computing node according to an embodiment of the present invention.

The present invention relates generally to the field of artificial intelligence ("AI") such as, for example, machine learning and/or deep learning. Many computing systems may include Artificial neural networks ("ANNs") to perform computational tasks in a manner inspired by biological architectures of the nervous system. These networks are based on a principle of biological systems whereby neurons are interconnected via synapses which relay signals between the neurons. A biological neuron processes its input signals and generates output signals which are transmitted to other neurons via respective synapses. Artificial neural networks are based on a logical construction in which a succession of layers of neurons are interposed with layers of synapses, with each synapse interconnecting a respective pair of neurons in successive neuron layers. Signals relayed via synapses are weighted according to respective synaptic weights stored for the synapses. Weighted signals can thus be propagated over successive layers of the network from an input to an output neuron layer.

To learn powerful representations, neural networks may require a large amount of training data. However, for many real-world problems, it is not always possible to obtain sufficiently large, cleanly labeled datasets. Instead, a set of labeled training data that is limited in size and possibly with corrupted labels is used as training data, which may negatively affect a machine learning model performance. Although acquiring a large dataset is not difficult, accurate labeling of the data is expensive and an error-prone task and may requiring involvement of human interaction.

For example, in supervised machine learning, the machine learning model is given labeled training data including pairs of an input X and a label Y. Acquisition of large, labelled data is a tedious task, and, in many cases, it is impractical or infeasible to acquire labelled data at very large scale. In unsupervised learning, data is completely unlabeled. In semi-supervised learning there is both labeled data and unlabeled data. In some use-cases, there may be for each input instance X a set of candidates. Among these candidates, there may be one or more true, correct labels but it is difficult to know which ones are the correct labels specifically. Furthermore, we can consider the case with no true label. The process of learning the true, correct labels where the machine learning model has one or more unknown true labels may be referred to as reasonable language model learning with unknown true labels (e.g., reasonable language model learning with unknown true labels). Acquisition of large candidate sets may be possible is some specific usecases such as, for example, in learning for generating texts from triples from a knowledge graph, where candidate generated texts can be acquired using information retrieval systems. It should be noted that a "triple" may be a set of three entities that codifies a statement about text data in the form of subject-predicate-object expressions (e.g., "John is 35" or "John knows Jane").

A reasonable language model learning with unknown true labels may be illustrated as follows. For a given input: $\{X_1 (Y_{11}, Y_{12}, \ldots, Y_{1n})\}, \ldots, \{X_m (Y_{m1}, Y_{m2}, \ldots, Y_{mn})\}$, where $X_i$ is a list of triples from a knowledge graph and is an input to a prediction model $f(X_i, w)$ (e.g. a neural network where w is a set of parameters of the model. Assume that $Y_{ij}$ are candidate labels (e.g., a small fragment of texts) of $X_i$, where it is known that a candidate set may contain a true label denoted as $Y_i$ (if exists) while the other are wrong labels. In this case, there exists correct labels in the set of candidates, and the are one or more correct labels in the set of candidates that are known, but it is unknown which of ones of the total labels are the true and correct labels. It is also assumed that there may be situations where the candidate set (or candidate label set) does not contain any labels and these candidate sets correspond to noisy candidate sets. The candidate set consists of a set of texts that may be the right label for an input set of triples. Also, there may be a case where there are no true label in the candidate set, and, in such case, the candidate set is considered as noise and the operations described herein would then process the unknown labels of the candidate set. Also, it may be assumed that the reasonable learning problem deals with a very large set of possible labels, which may be indefinite, and larger than the size of candidate sets used in training such as, for example, in the language generation problems, the domain of target is significantly large while the set of candidates is limited.

For further explanation, consider the following example. Given two facts in a data source, $X_1$ may represent the triple ("Albert Einstein" "has Father" "Hermann Einstein") and $X_2$ may represent the triple ("Albert Einstein" "has Mother" "Pauline Koch"), a machine learning operation may express this knowledge data in natural language as "His parents are Hermann Einstein, a salesman and engineer, and Pauline Koch." The given task is called "story-telling" (i.e., express knowledge in natural language). Teaching machine learning operations/machines story-telling require labeled training data with a list of pairs (X, Y), where X is the input triples and Y is an expected text telling the story behind X. However, acquisition of large-scale labelled training data is a tedious task. Instead, weak labels may be leveraged by using an information retrieval ("IR") system to get a list of candidate labels $(Y_1, Y_2X, \ldots Y_n)$ for X from the data source pages of Albert Einstein. "Weak labels" describe the situation when the training data consists of training instances $(X_1, Y_1), \ldots, (X_n, Y_n)$ but some labels $Y_i$ may be wrong and thus are noisy training instances. With an IR system, it may be known that there may be no label, or one or more true labels in the set $(Y_1, Y_2, \ldots Y_n)$. However, it is unknown which ones of the true labels in the set $(Y_1, Y_2, \ldots Y_n)$ exist in the set of candidates. Accordingly, a need exits to train a prediction model (e.g., a neural network) using the given type of input data (pair of input and candidate).

Thus, in some implementations, the present invention provides a solution for reasonable language model learning for text data in a knowledge graph by 1) training a reasonable language model using triples and associated candidate labels generated from knowledge graphs and a large text corpus, and 2) "text generation" for new triples using the trained reasonable language model.

In some implementations, providing an intelligent system for reasonable language model learning for text data in a knowledge graph in a computing environment, by one or more processors, is depicted. One or more data sources and one or more triples may be analyzed from a knowledge graph. Training data having one or more candidate labels associated with one or more of the triples may be generated. One or more reasonable language models may be trained based on the training data.

In some implementations, various embodiments described herein may perform an AI operation such as, for example, a natural language processing ("NLP") operation for providing the reasonable language model learning for text data in a knowledge graph. In an additional embodiment, a corpus of text data (e.g., text documents such as, for example, millions of news articles, journals, papers, and/or reports) may be received as input. The corpus of text data (e.g., text documents) and knowledge data may be ingested, traversed, and transformed into a collection of relevant candidate texts. Training data having one or more candidate labels associated with one or more of the triples may be generated. One or more reasonable language models may be trained based on the training data.

It should be noted as described herein, the term "intelligent" (or "cognitive/cognition") may be relating to, being, or involving conscious intellectual activity such as, for example, thinking, reasoning, or remembering, that may be performed using a machine learning. In an additional aspect, cognitive or "intelligent may be the mental process of knowing, including aspects such as awareness, perception, reasoning and judgment. A machine learning system may use artificial reasoning to interpret data from one or more data sources (e.g., sensor based devices or other computing systems) and learn topics, concepts, and/or processes that may be determined and/or derived by machine learning.

In an additional aspect, cognitive or "intelligent" may refer to a mental action or process of acquiring knowledge and understanding through thought, experience, and one or more senses using machine learning (which may include using sensor based devices or other computing systems that include audio or video devices). Cognitive/intelligent may also refer to identifying patterns of behavior, leading to a "learning" of one or more events, operations, or processes. Thus, the intelligent model may, over time, develop semantic labels to apply to observed behavior and use a knowledge domain or ontology to store the learned observed behavior. In one embodiment, the system provides for progressive levels of complexity in what may be learned from the one or more events, operations, or processes.

In an additional aspect, the term intelligent may refer to an intelligent system. The intelligent system may be a specialized computer system, or set of computer systems, configured with hardware and/or software logic (in combination with hardware logic upon which the software executes) to emulate human cognitive functions. These intelligent systems apply human-like characteristics to convey and manipulate ideas which, when combined with the inherent strengths of digital computing, can solve problems with a high degree of accuracy (e.g., within a defined percentage range or above an accuracy threshold) and resilience on a large scale. An intelligent system may perform one or more computer-implemented intelligent operations that approximate a human thought process while enabling a user or a computing system to interact in a more natural manner. An intelligent system may use AI logic, such as NLP based logic, for example, and machine learning logic, which may be provided as specialized hardware, software executed on hardware, or any combination of specialized hardware and software executed on hardware. The logic of the intelligent system may implement the intelligent operation(s), examples of which include, but are not limited to, question answering, identification of related concepts within different portions of content in a corpus, and intelligent search algorithms, such as Internet web page searches.

In general, such intelligent systems are able to perform the following functions: 1) Navigate the complexities of human language and understanding; 2) Ingest and process vast amounts of structured and unstructured data; 3) Generate and evaluate hypotheses; 4) Weigh and evaluate responses that are based only on relevant evidence; 5) Provide situation-specific advice, insights, estimations, determinations, evaluations, calculations, and guidance; 6) Improve knowledge and learn with each iteration and interaction through machine learning processes; 7) Enable decision making at the point of impact (contextual guidance); 8) Scale in proportion to a task, process, or operation; 9) Extend and magnify human expertise and intelligent; 10) Identify resonating, human-like attributes and traits from natural language; 11) Deduce various language specific or agnostic attributes from natural language; 12) Memorize and recall relevant data points (images, text, voice) (e.g., a high degree of relevant recollection from data points (images, text, voice) (memorization and recall)); and/or 13) Predict and sense with situational awareness operations that mimic human intelligent based on experiences.

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
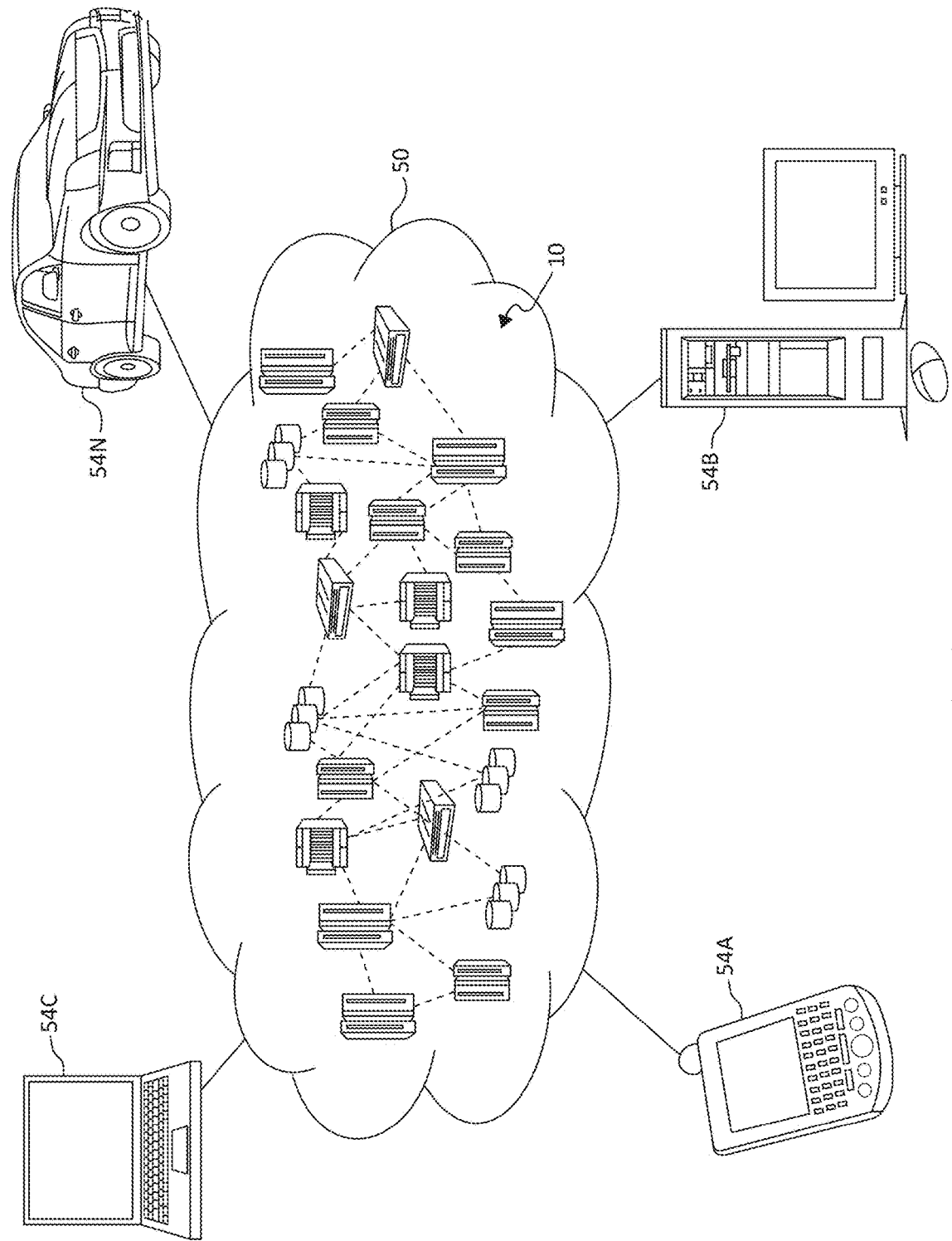
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
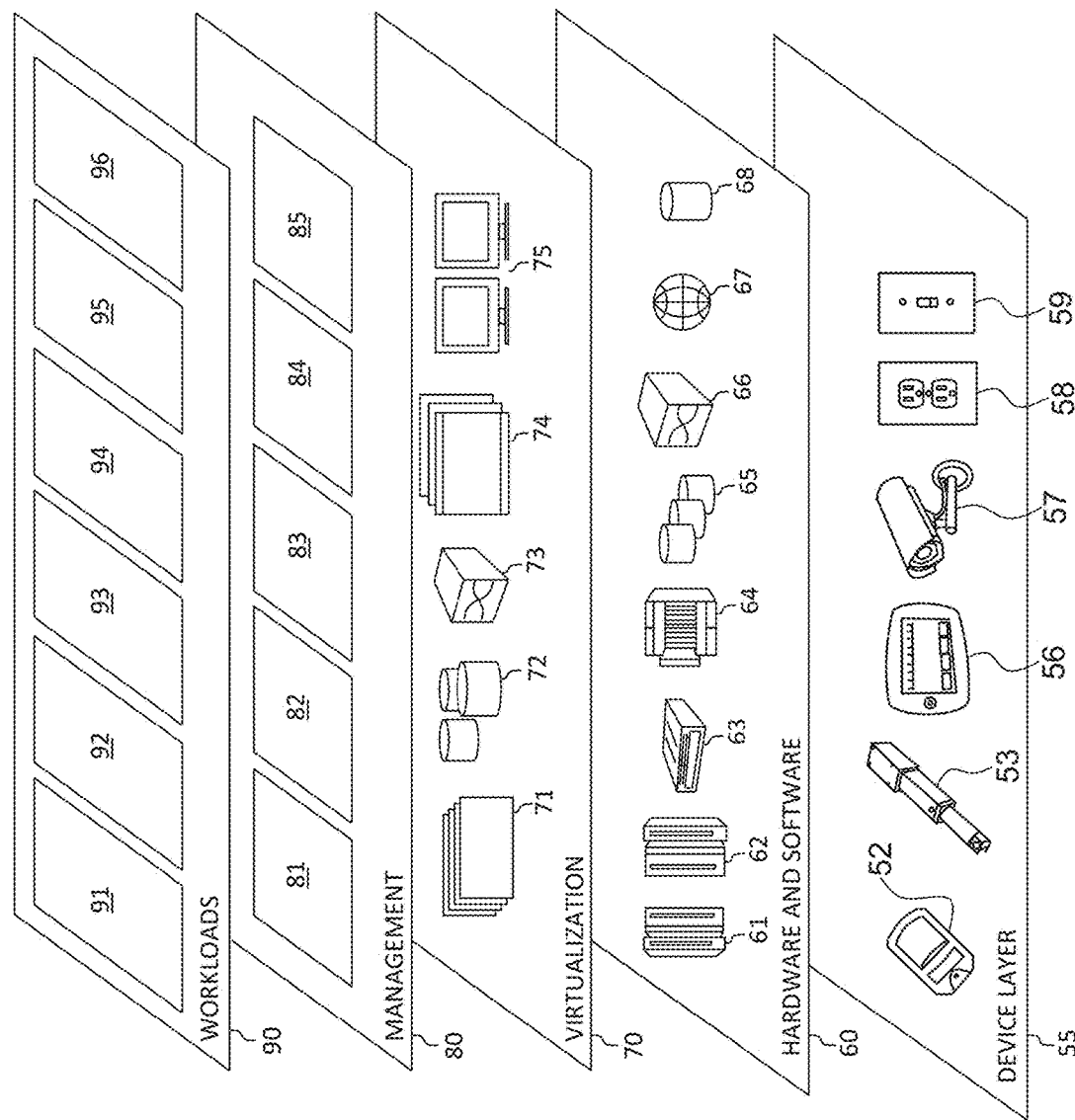
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing a reasonable language model learning for text data in a knowledge graph. In addition, workloads and functions 96 for providing a reasonable language model learning for text data in a knowledge graph may include such operations as data analytics, data analysis, and as will be further described, notification functionality. One of ordinary skill in the art will appreciate that workloads and functions 96 for providing a reasonable language model learning for text data in a knowledge graph may also work in conjunction with other portions of the various abstraction layers, such as those in hardware and software 60, virtualization 70, management 80, and other workloads 90 (such as data analytics processing 94, for example) to accomplish the various purposes of the illustrated embodiments of the present invention.

Thus, as described herein, in various implementation, the present disclosure provides for candidate generation where a knowledge graph and a text corpus are used by a machine learning operations. Output data may include one or more triples and associated candidate texts describing triples. A reasonable language model may be trained using given training data created by the mentioned candidate generation method.

In some implementations, text data may be generated from input factual triples using given trained reasonable language model. That is, a system may include a candidate generator that takes input from a knowledge graph and text corpus. The candidate generator provides training data in a format d where format d is defined as $\{X_1 (Y_{11}, Y_{12}, \ldots, Y_{1n})\}, \ldots, \{X_m (Y_{m1}, Y_{m2}, \ldots, Y_{mn})\}$, where $X_i$ is a list of triples from a knowledge graph and is an input to train a prediction model $f(X_i, w)$ (e.g., a neural network where w is a set of parameters of the model and $Y_{ij}$ are candidate labels (e.g., a small fragment of texts) of $X_i$, where it is known that a candidate set may contain a true label denoted as $Y_i$ (if exists) while the other are wrong labels.

In this case, there exists correct labels in the set of candidates, and there are one or more correct labels in the set of candidates that are known, but it is unknown which of ones of the total labels are the true and correct labels. It is also assumed that there may be situations where the candidate set does not contain any labels and these candidate sets correspond to noisy candidate sets. Also, it may be assumed that the reasonable learning problem deals with a very large set of possible labels, which may be indefinite, and larger than the size of candidate sets used in training such as, for example, in the language generation problems, the domain of target is significantly large while the set of candidates is limited.

Thus, in some implementations, the present invention provides a solution for reasonable language model learning for text data in a knowledge graph by 1) training a reasonable language model using triples and associated candidate labels generated from knowledge graphs and a large text corpus, and 2) "text generation" for new triples using the trained reasonable language model.

The training data may be created by: 1) creating a set of keywords from the list of triples and 2) searching a text corpus using an information retrieval system to find top relevant candidate fragment of texts that match the keywords created from the input triples. These fragment of texts are considered as the candidate labels for the given list of triples.

In some implementations, a reasonable language model learning operation may use the training data created in the format $\{X_1 (Y_{11}, Y_{12}, \ldots, Y_{1n})\}, \ldots, \{X_m (Y_{m1}, Y_{m2}, \ldots, Y_{mn})\}$ and use a neural network $f(X_i, w)$, where w is a set of parameters of the neural network. The final output may be a trained neural network $f(X, w)$ that is able to approximate the true label $Y_i$ of any input $X_i$.

In some implementations, text data may be generated from input triples using trained reasonable language model. In order to train the network, a mixed-integer programming optimization problem may be solved. In one aspect, the mixed-integer programming problem is changed/turned into a convex continuous relaxation problem. The convex relaxation problem may be automatically applied for dealing with cases where there are no correct labels or very noisy labels (partially correct) is obtained during training process by solving an optimization model with loss function that penalizes unknown noisy training instances with adaptive penalty thresholds that are learned from training data automatically. Additionally, an alternating optimization operation may be used to solve the continuous optimization problem by alternating the optimization process between optimizing the prediction loss and optimizing the candidate selection factors.

It should be noted that, as used herein, mixed-integer programming is an optimization problem in which some or all of the variables are restricted to be integers. Current machine learning operation use a continuous optimization model (i.e., all variables are continuous), which is easier to be trained than a mixed-integer programming. However, continuous variables are not flexible enough to model some complex loss functions, which might lose prediction accuracy. Integer variables are much more powerful to model a loss function in machine learning. Hence, in some implementation, the mechanisms of the illustrated embodiments and present disclosure propose a mixed-integer programming to train the prediction model, which should improve prediction accuracy over existing continuous optimization models. In the second embodiment, we also propose another optimization model to train the prediction model; that is the convex continuous relaxation problem.

Figure 4:
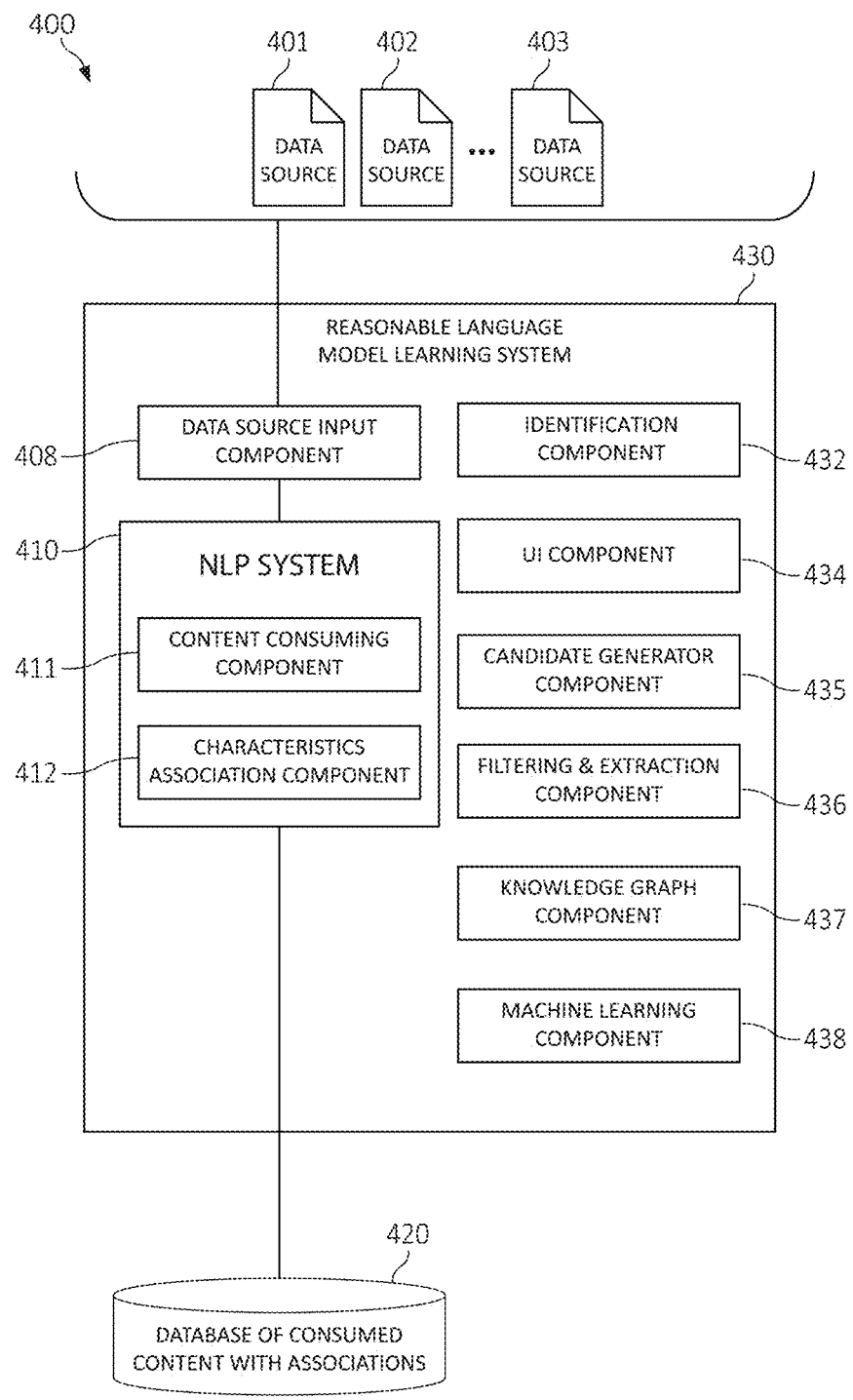
FIG. 4 is an additional block diagram depicting an exemplary functional relationship between various aspects of the present invention.

Turning now to FIG. 4, a block diagram of exemplary functionality 400 relating to reasonable language model learning is depicted. As shown, the various blocks of functionality are depicted with arrows designating the blocks' 400 relationships with each other and to show process flow. Additionally, descriptive information is also seen relating each of the functional blocks 400. As will be seen, many of the functional blocks may also be considered "modules" of functionality, in the same descriptive sense as has been previously described in FIGS. 1-3. With the foregoing in mind, the module blocks 400 may also be incorporated into various hardware and software components of a system for intelligent application management in accordance with the present invention, such as those described in FIGS. 1-3. Many of the functional blocks 400 may execute as background processes on various components, either in distributed computing components, or on the user device, or elsewhere.

Multiple data sources 401-403 may be provided by one or more computing systems (e.g., servers, databases, storage systems, hardware systems, cloud computing systems, other software applications/components, network systems, etc.). The data sources 401-403 may include various files, records, software components, contextual data/information, tables, applications, or other elements/items associated with a software application/program. The group of data sources 401-403 are consumed such as, for example, using natural language processing (NLP) and artificial intelligence (AI) to provide processed content.

The data sources 401-403 may be analyzed by an NLP component 410 to data mine or transcribe relevant information from the content of the data sources 401-403 (e.g., files, records, tables, documents, emails, reports, notes, audio records, video recordings, live-streaming communications, etc.) in order to display the information in a more usable manner and/or provide the information in a more searchable manner. The NLP component 410 may be provided as a cloud service or as a local service.

The reasonable language model learning system 430 may include the NLP component 410, a content consuming component 411, a characteristic association component 412, and a post-processing analytics component 450. The NLP component 410 may be associated with the content consuming component 411. The content consuming component 411 may be used for inputting, receiving, searching, or collecting various data from the data sources 401-403 and running NLP and AI tools against them, learning the content, such as by using the machine learning component 438. It should be noted that other components of FIG. 4 may also employ one or more NLP systems and the NLP component 410 is merely illustrated by way of example only of use of an NLP system. As the NLP component 410 (including the machine learning component 438) learns different data and/or sets of data, the characteristics association component 412 (or "intelligent characteristics association component") may use the artificial intelligence to make associations or links between various data or other software components of the data sources 401-403 by determining common concepts, methods, features, systems, licenses, similar characteristics, and/or an underlying common topic.

As used herein "intelligent" (e.g., cognition or "AI") is the mental process of knowing, including aspects such as awareness, perception, reasoning and judgment. An AI system uses artificial reasoning to interpret the data sources 401-403 and extract their topics, ideas, or concepts. The learned software, software components, software applications, tables, records, files, concepts, suggestions, topics and subtopics of a domain of interest, may not be specifically named or mentioned in the data sources 401-403 and is derived or inferred by the AI interpretation. In one aspect, one or more of the data sources 401-403 may be a knowledge domain.

The learned content of the data sources consumed by the NLP system may be merged into a database 420 (and/or knowledge store) or other data storage method of the consumed content with learned concepts, methods, and/or features of the data sources 401-403 providing association between the content referenced to the original data sources 401-403.

The database 420 may maintain a timestamped record of all interactions and contributions of each software component, software license, software signature file, contextual information, software content contributor/administrator, criteria, subject, topic, or idea. The database 420 may record and maintain the evolution of software components, changes, adjustments, software licenses, software signature files, contextual information, software content contributors/ administrators, criteria, subject, topic, or idea indicated, analyzed, identified, tagged, or discussed in the data sources 401-403.

The database 420 may track, identify, and associate all activity, events, changes, software updates, software decommissions, software component, software license, software signature file(s), contextual information, software content contributor/administrator, criteria, subject, topic, or idea and the like of all data generated during all stages of the development, retention, or decommission or "life cycle" of the decisions, decision elements, alternatives, choices, criteria, subjects, topics, or ideas. The merging of the data into one database 420 (which may include a domain knowledge) allows the reasonable language model learning system 430 to act like a search engine, but instead of keyword searches, it will use an AI method of making intellectual associations between the data sources using the deduced concepts.

The reasonable language model learning system 430 may include a user interface ("UI") component 434 (e.g., an interactive graphical user interface "GUI") providing user interaction with the indexed content for mining and navigation and/or receiving one or more inputs/queries from a user. More specifically, the user interface component 434 may be in communication with a wireless communication device 455 (see also the PDA or cellular telephone 54A, the desktop computer 54B, the laptop computer 54C, and/or the automobile computer system 54N of FIG. 2) for also providing user input for inputting data such as, for example, queries to issue to data sources 401-403. The wireless communication device 455 may use the UI component 434 (e.g., GUI) for providing input of data and/or providing a query functionality such as, for example, interactive GUI functionality for enabling a user to enter a query in the GUI 422 relating to a software application, software retentions/ decommissions, software components, software license, software signature files, contextual information (e.g., data linking software applications and associated files, records, information) software content contributor/administrator data, feedback data, criteria, domain of interest, topic, and/or an associated objective. For example, GUI 422 may display a query relating to whether or not a selected application may be decommissioned with one or more associated query results/answers.

The reasonable language model learning system 430 may also include an identification component 432. The identification component 432 may be used to identify one or more data sources 401-403 associated with each of a plurality of applications in one or more internal and/or external computing systems. The identification component 432 may be used to define that one or more data sources (e.g., data sources 401-403) include structured data, semi-structured data, and non-structured data in the computing system and that the one or more data sources (e.g., data sources 401-403) is associated with one or more of the plurality of applications.

In one aspect, once the NLP component 410 has carried out, the identification component 432, in association with the NLP component 410, may link software components, software applications, contextual information, and other data, records, files, and information and may mine the data sources 401-403 and/or the database 420 of the consumed content to assist the ranking component to rank each of the software applications.

The reasonable language model learning system 430 may also include filtering and extraction component 436 for extracting the extracted features from the one or more data sources. That is, the filtering and extraction component 436 may work in conjunction with the NLP system 410 to consume and mine one or more data sources 401-403 for a topic or subject, including associated features and/or characteristics of the topic or subject.

The reasonable language model learning system 430 may also include a candidate generator component 435, a knowledge graph component 437, and a machine learning component 438 to analyze one or more data sources 401-403 and a plurality of triples from a knowledge graph. The knowledge graph may be included and stored in the knowledge graph component 437. That knowledge graph component 437 may traverse the knowledge graph analyzing one or more nodes and edges. The candidate generator component 435 may generate training data having one or more candidate labels associated with the plurality of triples. The candidate generator component 435, in association with the machine learning component 438, may train one or more reasonable language models based on the training data.

The candidate generator component 435, in association with the machine learning component 438, may generate text data by the one or more reasonable language models using the plurality of triples. The candidate generator component 435, in association with the machine learning component 438, may create a set of keywords from a list of the plurality of triples.

The candidate generator component 435, in association with the machine learning component 438, may identify the one or more candidate labels matching a set of keywords from a list of the plurality of triples by searching the one or more data sources using an informational retrieval operation. The candidate generator component 435, in association with the machine learning component 438, may enhance the one or more candidate labels with additional information extracting from one or more external sources.

The candidate generator component 435, in association with the machine learning component 438, may identify semantic similarities between data in the one or more data sources and the plurality of triples from the knowledge graph, and associate the one or more candidate labels with the plurality of triples from the knowledge graph based on the semantic similarities.

The candidate generator component 435, in association with the machine learning component 438, may generate text data from one or more input triples using the one or more reasonable language models, wherein the one or more reasonable language models approximates true labels for the one or more input triples and the text data describes the one or more input triples.

The machine learning component 438 may apply one or more heuristics and machine learning based models using a wide variety of combinations of methods, such as supervised learning, unsupervised learning, temporal difference learning, reinforcement learning and so forth. Some non-limiting examples of supervised learning which may be used with the present technology include AODE (averaged one-dependence estimators), artificial neural networks, Bayesian statistics, naive Bayes classifier, Bayesian network, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting examples of temporal difference learning may include Q-learning and learning automata. Specific details regarding any of the examples of supervised, unsupervised, temporal difference or other machine learning described in this paragraph are known and are considered to be within the scope of this disclosure.

Figure 5A:
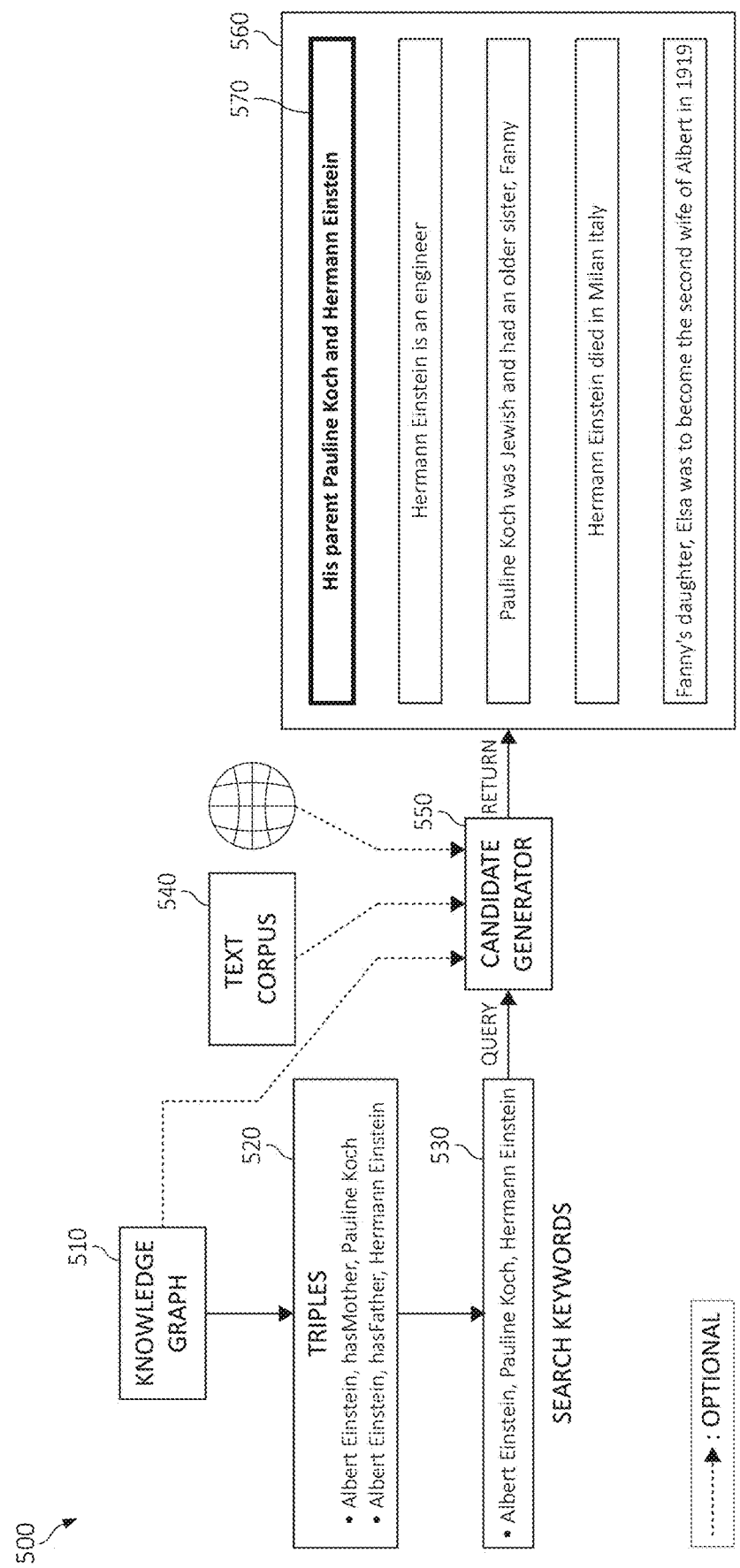
FIG. 5A-5B are block diagrams depicting operations for training data creation in a computing environment according to an embodiment of the present invention.
Figure 5B:
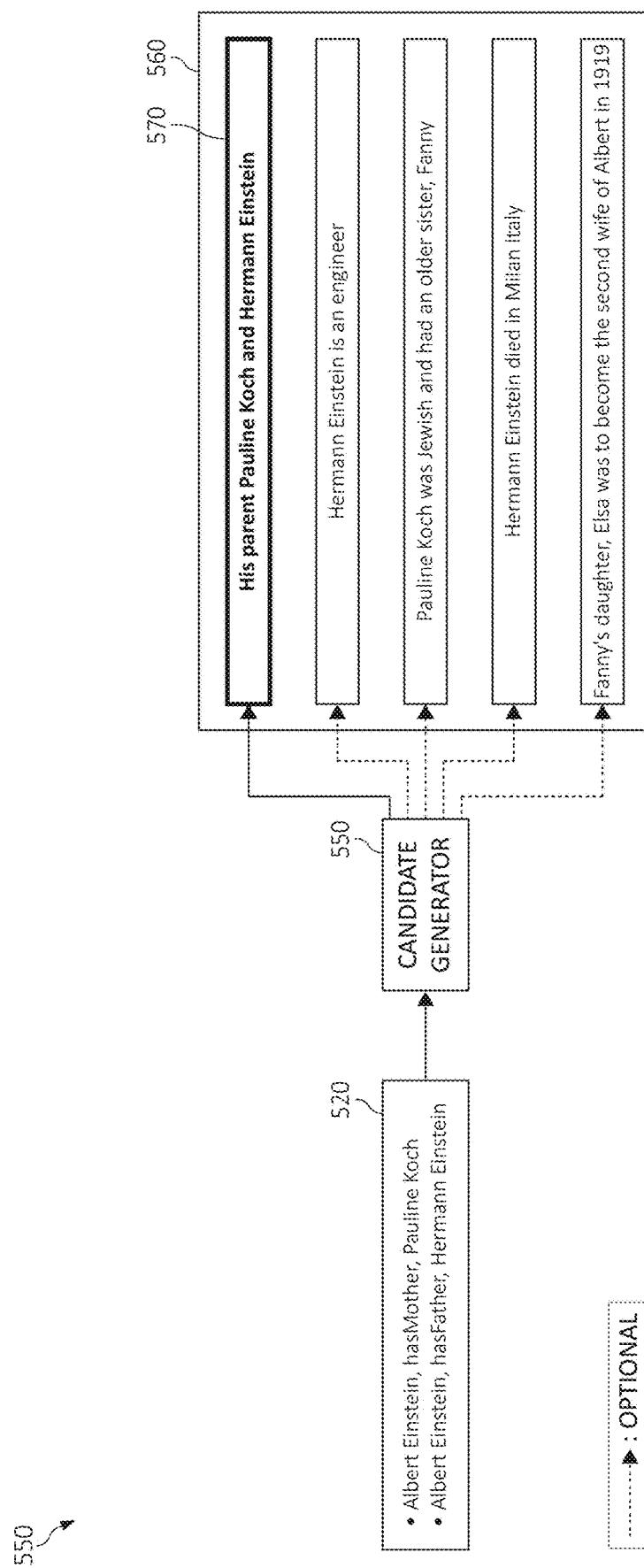

Turning now to FIG. 5A-B, a block diagram of exemplary functionality 500 and 550 relating to training data creation is depicted. As shown, the various blocks of functionality are depicted with arrows designating the blocks' 500 and 525 relationships with each other and to show process flow. As shown, the various functionality, or "modules" of functionality, hardware devices, and/or other components in the same descriptive sense as has been previously described in FIGS. 1-4 may be included in FIGS. 5A-5B. Additionally, descriptive information is also seen relating each of the functional blocks 500 and 550. As will be seen, many of the functional blocks may also be considered "modules" of functionality, in the same descriptive sense as has been previously described in FIGS. 1-4. With the foregoing in mind, the module blocks 500 and 550 may also be incorporated into various hardware and software components of a system for extraction and summarization of decisions in accordance with the present invention, such as those described in FIGS. 1-4. Many of the functional blocks 500 may execute as background processes on various components, either in distributed computing components, or on the user device, or elsewhere.

In some implementations, the reasonable language model learning system 430 of FIG. 4, a candidate generator 550 may receive as input a candidate triple 520 from a knowledge graph 510 that has been traversed and searched. In one aspect, the candidate generator 550 may receive the candidate triple 520 based on a query 530 containing the candidate triple 520 as search keywords. In some implementations, the candidate generator 550 may receive the candidate triple 520 from a text corpus 540.

The candidate generator 550 may analyze and process the candidate triple 520 to generate (as output) a set of candidate text data 560 or candidate text data (e.g., candidate sentences/chunks of text. The set of candidates 560 may contain one or more lexicalization for a given triple such as, for example, triple 570. The candidate generator 550 may enrich the candidates set by retrieving additional information from an external source (e.g., another computing system, a cloud computing system, the internet, etc.).

In some implementations, the candidate generator 550 may determine and assign a degree of matching (e.g., a matching degree by measuring a difference between two sequences such as, for example, a "Levenshtein distance") between all the sentences in the text corpus and each of the triples such as, for example, the triple 570. The output candidates set 560 may contain all the sentences below a certain distance threshold.

In one alternative implementation, the candidate generator 550 may be implemented computing a matching degree that rely on a Named Entity Recognition ("NER") system (that may also use information from an ontology). The probabilities of containing the entities/relationship of the triple in the sentences can be used with a threshold to generate the candidates set.

For example, as illustrated in FIG. 5B, one or more candidate triple 520 (e.g., facts) are input into the candidate generator 550. The candidate generator 550 provides the output candidates set 560 that may include one or more lexicalizations for each of triple. However, at this point, it may be unknown as to which triples include the one or more lexicalizations and how many lexicalizations there are in the candidates set 560. Thus, the output candidates set 560 may be considered as training data having one or more candidate labels associated with the plurality of triples and used for training one or more reasonable language models based on the training data.

Figure 6A:
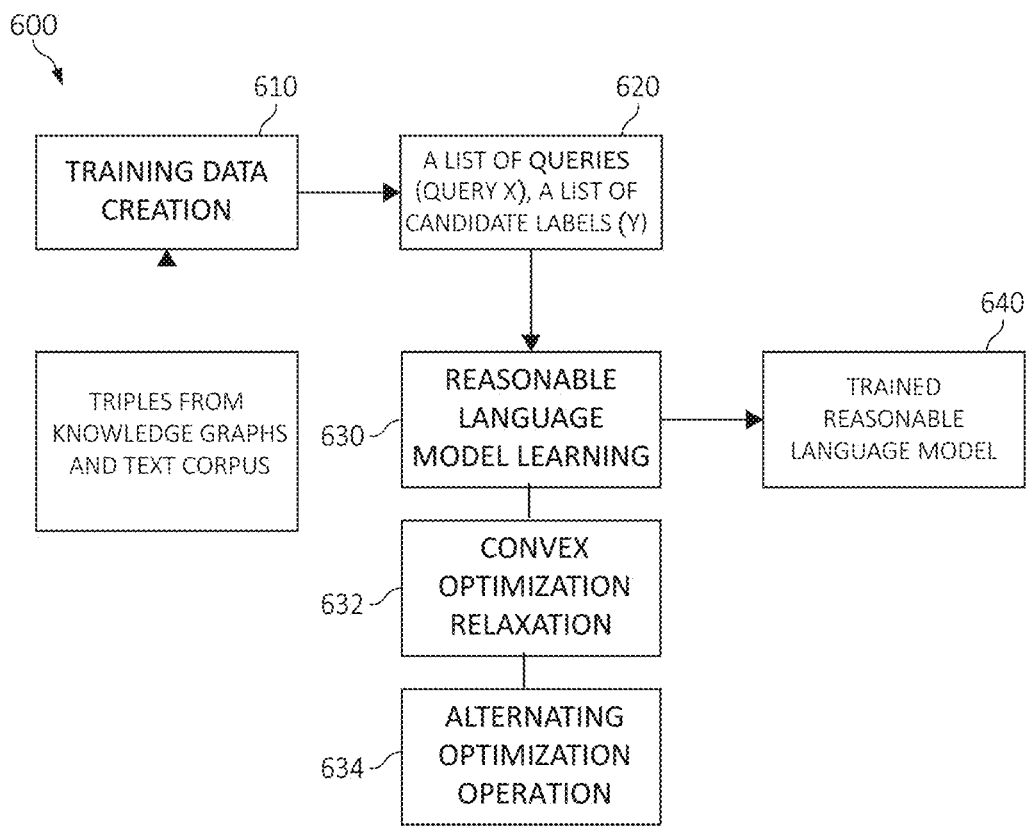
FIG. 6A is block flow diagram depicting operations for training reasonable language model learning in a computing environment according to an embodiment of the present invention.
Figure 6B:
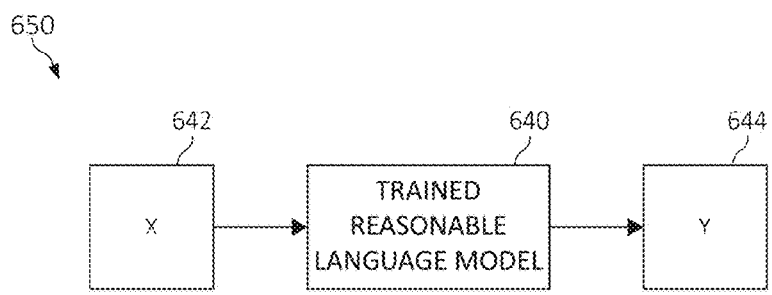
FIG. 6B is block flow diagram depicting operations for generating text from input triples using the trained machine learning models of FIG. 6A in a computing environment according to an embodiment of the present invention.

For further explanation, FIG. 6A is block flow diagrams depicting operations for training reasonable language model learning. FIG. 6B is block flow diagram depicting operations for generating text from input triples using the trained machine learning models of FIG. 6A in a computing environment. In one aspect, the created training data (e.g., the output candidates set 560 of FIG. 5A-5B) may be used for training reasonable language model.

In some implementations, training data may be created from one or more triples from triples sourced from knowledge graphs and text corpus, as in block 610. The training data may be a list of queries (e.g., query X) and a list of candidate labels (e.g., labels Y), as in block 620. A reasonable language model learning operation may be performed using the list of queries and list of candidate labels, as in block 630. A trained reasonable language model may be generated, as in block 640.

Returning now to block 630, performing reasonable language model learning operation may include convex optimization relaxation operation, as in block 632 and alternating optimization, as in block 634.

For example, performing reasonable language model learning operation may include formal formulation of the reasonable language model learning operation problem. For example, given a data set $D=\{X_i,(Y_i^1, \ldots, Y_i^{m_i})\}_{i=1}^N$ with $X_i \in \mathbb{R}^n$ being a message or a conversational context and $Y_i^j \in \mathbb{R}^d$ a response candidate of $X_i$, the reasonable language model learning operation seeks to learn a matching model $\mathcal{M}(w; \ldots,)$ from D. For any new pair (X, Y), $\mathcal{M}(w; X, Y,)$ measures the matching degree between X and Y (e.g., the smaller the matching degree the better). The $\mathcal{M}(w; X, Y,)$ may be represented as a composition of a prediction model f and loss function L where:

$$f(W; \ldots,): \mathbb{R}^n \to \mathbb{R}_{++}^d, L: \mathbb{R}^d * \mathbb{R}^d \to \mathbb{R}_{++}, \quad (1).$$

In some implementations, an optimization model to train the prediction model is depicted in equation 2:

$$\frac{1}{N}\sum_{i=1}^N \min_j\{L(f(w; X_i), Y_i^j): \text{ for all } j = 1 \ldots \min_j\}, \quad (2),$$

However, one challenge with such equation (2) is non-smooth and non-convex, which has many bad local minimum giving low prediction accuracy. It should be noted that the mathematical properties of function equation may be characterized as "non-smooth and non-convex"), which are difficult to train, thus training is difficult. As such, the equation can be reformulated as a mixed-integer program despite being difficult to solve. The mixed-integer program equation can be:

$$\min_{w,u_i} \frac{1}{N}\sum_{i=1}^{N} L(f(w; X_i), Y_i^j) \sum_{j=1}^{m_i} u_i^j y_i^j, \quad (3)$$

$$s.t \sum_{j=1}^{m_i} u_i^j = 1, \forall_i,$$

$$u_i^j \in \{0, 1\}, \forall_i, j,$$

An $\ell_1$-norm "convex" relaxation is:

$$\min_{w,u_i} \frac{1}{N}\sum_{i=1}^{N} \left( L(f(w; X_i), Y_i^j), \sum_j u_i^j y_i^j \right) + \lambda \|u_i\|_1 \right), \quad (4)$$

$$s.t \sum_j u_i^j = 1, \forall_i,$$

$$0 \le u_i \le 1, \forall_i,$$

For some $\lambda > 0$. The value $u_i^j$ can be interpreted as a weight for the response candidate $y_i^j$. The cross entropy loss may be a commonly used loss function. Thus, the predicted value of $\hat{y}_i = f(w^{(t)}; X_i)$ and the estimated label $\bar{y}_i = \Sigma_j u_i^j y_i^j$ then the cross entropy loss may be reflected in equation 5:

$$L\left(f(w^{(t)}; X_i), \sum_j u_i^j y_i^j\right) = H(\bar{y}_i, \hat{y}_i) = \sum_k \bar{y}_k \log \hat{y}_k\right). \quad (5)$$

The cross entropy loss may perform as expected when there are correct labeled data and $\bar{y}_i = \Sigma_j u_i^j y_i^j$ is known. It is asymmetric and only considers a one-direction penalty on encoding samples from $\hat{y}_i$ using code optimized for $\bar{y}$. In some implementations, y may be an estimated label and the notation of a "true label" (or correct/accurate label) may be liberally defined and both $\hat{y}_i$ and $\bar{y}_i$ may be unknown quantities. As such, in some implementations, a symmetric cross entropy loss ("SCCE") may be used such as in equation 6:

$$L_{SCCE}(\hat{y}_i, \bar{y}_i) = H(\bar{y}_i, \hat{y}_i) + H(\hat{y}_i, \max\{\bar{y}_i, \epsilon\}) = \quad (6)$$

$$-([y_i^1, \ldots, y_i^{m_i}]u_i)^T \log(\hat{y}_i) - \hat{y}_i^T \log(\max\{[y_i^1, \ldots, y_i^{m_i}]u_i), \epsilon\}).$$

Turning now to block 632, in relation to the "convex optimization relaxation" operation, it should be noted there may exist a row of the matrix $[y_i^1, \ldots, y_i^{m_i}]$ that is zero. As a result, $H(\bar{y}_i, \hat{y}_i) = \Sigma_{k=1}^d (\hat{y}_k \log((\Sigma_j u_i^j y_i^j))k))$ can be defined since $\log((\Sigma_j u_i^j y_i^j))k))$ is equal to log 0. Hence, $H(\bar{y}_i, \max\{\bar{y}_i, \epsilon\})$ may be used instead of $H(\bar{y}_i, \hat{y}_i)$, which is defined for any value of $\bar{y}_i$.

The loss function $L_{SCCE}(\hat{y}_i, \bar{y}_i)$ may contain some elements of the form of log $u_i^j$, which may prevent $u_i^j$ to be mathematically zero. As such, mechanisms of the illustrated embodiments may introduce a new $\epsilon$-sparsity notation, meaning that for a given small $\epsilon > 0$, a vector X is called an $\epsilon$-sparse solution if many elements satisfy $|X_i| = \epsilon$. The target function may be:

$$\frac{1}{N}\sum_{i=1}^{N} L_{SCCE}\left(f(w; X_i), \sum_j u_i^j y_i^j\right) + \lambda \|u_i\|_1. \quad (7)$$

In some implementations, an additional prediction model may be used for reasonable language learning model with a new loss function such as, for example, as depicted in equation 8:

$$\min_{w,u_i} \frac{1}{N}\sum_{i=1}^{N} L_{SCCE}\left(f(w; X_i), \sum_j u_i^j y_i^j\right) + \lambda \|u_i - \epsilon\|_1), \quad (8)$$

$$s.t \sum_j u_i^j = 1, \forall_i,$$

$$0 \le u_i \le 1, \forall_i,$$

Similarly, a symmetric clipped KL divergence ("SCKL") loss may be used such as, for example, as indicated in equation 8:

$$L_{SCKL}(\hat{y}_i, \bar{y}_i) = KL_{clipped}(\max\{\bar{y}_i, \epsilon\}, \hat{y}_i) + KL_{clipped}(\hat{y}_i, (\max\{\bar{y}_i, \epsilon\}) = \quad (9)$$

$$-\bar{y}_i^T \log(\hat{y}_i) + \bar{y}_i^T \log(\max\{\bar{y}_i, \epsilon\}) - \hat{y}_i^T \log(\max\{\bar{y}_i, \epsilon\}, \epsilon\}) + \hat{y}_i^T \log(\hat{y}_i).$$

The prediction model for no matching may be determined using equation 10:

$$\min_{w,u_i} \frac{1}{N}\sum_{i=1}^{N} Z_i L\left(f(w; X_i), \sum_j u_i^j y_i^j\right) + \alpha(1 - Z_i), \quad (10),$$

$$s.t \sum_j u_i^j = 1, \forall_i,$$

$$u_i^j \in \{0, 1\}, \forall_i, j,$$

$$Z_i \in \{0, 1\}, \forall_i, j,$$

where $Z_i$ may be equal to zero ("0") and indicates there is no matching. Thus, the operations for convex optimization relaxation operation, as in block 632, may remove noisy labels during the training process of reasonable language model learning. That is, the convex optimization relaxation operation, as in block 632, may remove noisy labels during the training process of reasonable language model learning for linear regression.

Turning now to the alternating optimization, as in block 634, the following algorithm may be applied for reasonable language model learning alternating optimization.

In one aspect, the alternating optimization may be performed according to the following pseudo code and equations 11 and 12, as follows:
Initialize: $u_i^{(0)}$ for all i: For t=1, 2, . . . do:
Step 1) Fix $u_i^{(t)}$, solve for $w^{(t)}$:

$$\min_w \frac{1}{N}\sum_{i=1}^{N} L_{SCCE}\left(f(w; X_i), \sum_j u_i^{j(t)} y_i^j\right), \quad (11)$$

Step 2) Fix $w^{(t)}$, solve for $u_i^{(t+1)}$ for every sample $X_i$:

$$\min_{u_i} L_{SCCE}\left(f(w^{(t)}; X_i) \sum_j u_i^j y_i^j\right) + \frac{\lambda}{N} \|u_i - \epsilon\|_1 \quad (12),$$

$$\text{s.t} \sum_j u_i^j = 1,$$

$$0 \le u_i \le 1,$$

End.

Thus, in step 1, as indicated above, the challenge present in equation 10 may become a traditional supervised machine learning problem for learning w since $\Sigma_j u_i^{j(t)} y_i^j$ is given for a fixed $u_i^{j(t)}$. In some implementations, a stochastic gradient descent ("SGD") may be used to train the equation (e.g., problem) in step 2. In equation 12, with the loss function $L_{SCCE}$, a gradient projection algorithm may be solved where each iteration solves the sub equation (e.g., sub problems) of the form:

$$\min_v \alpha \|v-c\|^2 + \lambda \|v-\epsilon\|_1$$

$$s.t \Sigma_j v_j = 1,$$

$$0 \le v \le 1, \tag{13}$$

for some parameter $\alpha > 0$ and a vector c. This subproblem can be solved efficiently.

In some implementations, upon completion of the training phase, the system may output/generate a trained reasonable language model as depicted in FIG. 6A. The trained reasonable language model, as in block 640, can be used in a testing phase to generate texts from input triples.

To further illustrate, FIG. 6B depicts operations for text generation using the trained reasonable language model. For example, a triple ("x" such as, for example, Lam, occupation, basketball) may be provided as input, as in block 642. The trained reasonable language model, as in block 640, may be applied to generate the text data that describes the triple, as in block 644. That is, during text generation, a trained reasonable language model, as in block 640, receives input X (e.g., John Doe, occupation, basketball), from block 642, which includes new triples and generates an output Y which is a sentence describing the triples (e.g., John Doe is a professional basketball player).

In some implementations, the trained reasonable language model may be a neural network (e.g., a transformer with a language model head (e.g. BART, BERT, GPT etc.). The neural network may receive input in the form of a triple, encodes the triple into a vector representation, and turns it into a probability distribution of potential sentences conditioned on the input triple. In order to generate texts from the given probability distribution, a standard beam search operation is used to search for the most likely sentence that can be generated conditioned from the input trip.

Figure 7:
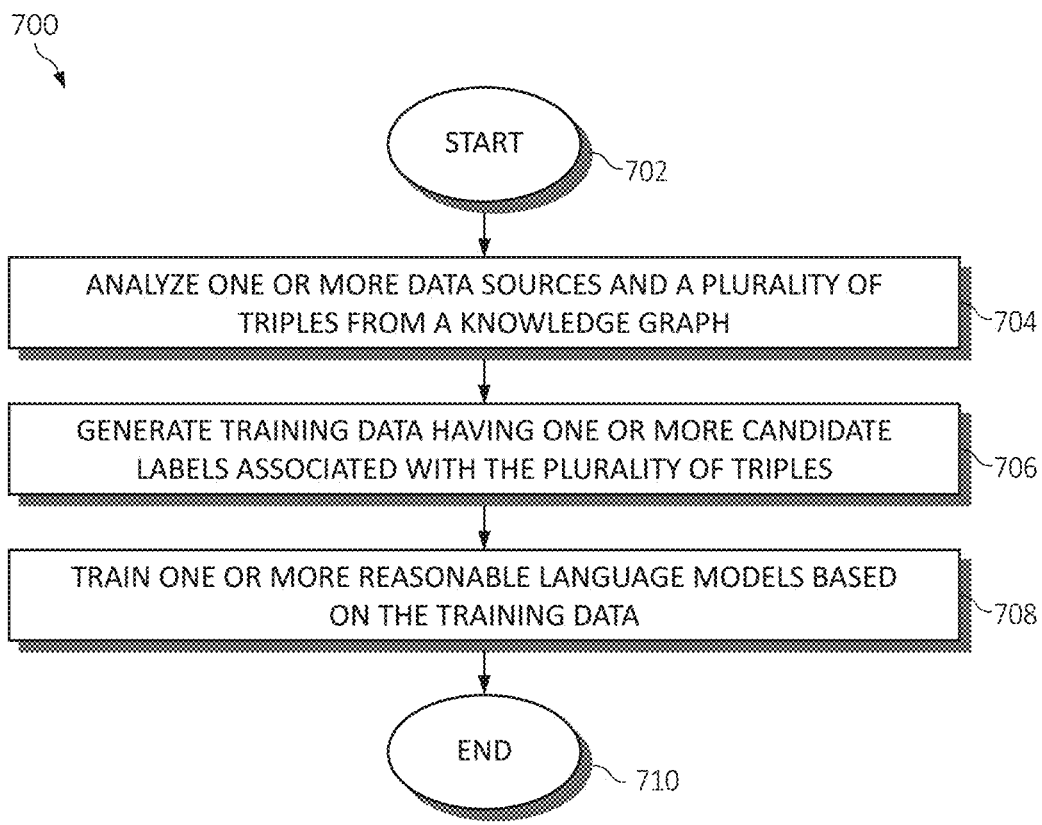
FIG. 7 is a flowchart diagram depicting an additional exemplary method for providing a reasonable language model learning for text data in a knowledge graph in a computing environment according to an embodiment of the present invention.

Turning now to FIG. 7, an additional method 700 for providing a reasonable language model learning for text data in a knowledge graph by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. As one of ordinary skill in the art will appreciate, the various steps depicted in method 700 may be completed in an order or version differing from the depicted embodiment to suit a particular scenario. The functionality 700 may start in block 702.

One or more data sources and one or more triples may be analyzed from a knowledge graph, as in block 704. Training data having one or more candidate labels associated with one or more of the triples may be generated, as in block 706. One or more reasonable language models may be trained based on the training data, as in block 708. The functionality 700 may end in block 710.

In one aspect, in conjunction with and/or as part of at least one block of FIGS. 7, the operations of method 700 may include each of the following. The operations of method 700 may generate text data by the one or more reasonable language models using the plurality of triples. The operations of method 700 may create a set of keywords from a list of the plurality of triples in conjunction with generating the training data. The operations of method 700 may identify, in conjunction with generating the training data, the one or more candidate labels matching a set of keywords from a list of the plurality of triples by searching the one or more data sources using an informational retrieval operation.

The operations of method 700 may enhance the one or more candidate labels with additional information extracting from one or more external sources. The operations of method 700 may identify semantic similarities between data in the one or more data sources and the plurality of triples from the knowledge graph; and associate the one or more candidate labels with the plurality of triples from the knowledge graph based on the semantic similarities.

The operations of method 700 may generate text data from one or more input triples using the one or more reasonable language models, wherein the one or more reasonable language models approximates true labels for the one or more input triples and the text data describes the one or more input triples.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for providing reasonable language model learning for text data in a computing system by a processor, comprising:
analyzing content from a plurality of data sources and a plurality of triples from a knowledge graph;
generating training data having a plurality of candidate labels derived from the analyzed content, each candidate label associated with a corresponding triple of the plurality of triples from the knowledge graph, the association of a first candidate label with a first triple based on semantic similarity between content from of a first data source and a keyword from the first triple;
training, by a convex continuous relation model, one or more reasonable language models based on the training data; and
generating text data by the trained reasonable language models using the plurality of triples.

2. The method of claim 1, wherein generating the training data further includes creating a set of keywords from a list of the plurality of triples.

3. The method of claim 1, wherein generating the training data further includes:
identifying the plurality of candidate labels matching a set of keywords from a list of the plurality of triples by searching the plurality of data sources using an informational retrieval operation.

4. The method of claim 1, further including:
enhancing the plurality of candidate labels with additional information extracted from one or more external sources.

5. The method of claim 1, further including:
identifying the semantic similarity between the data in the first data source and the first triple from the knowledge graph; and
associating the first candidate label with the first triple based on the semantic similarity.

6. The method of claim 1, further including generating text data from one or more input triples using the one or more reasonable language models, wherein the one or more reasonable language models approximates true labels for the one or more input triples and the text data describes the one or more input triples.

7. The method of claim 1, further comprising:
removing noisy labels from the plurality of candidate labels during the training.

8. The method of claim 1, wherein the plurality of data sources includes at least one of files, software components, or tables, the plurality of data sources associated with a target application.

9. The method of claim 8, further comprising:
merging the analyzed content of the plurality of data sources into a database including a timestamped record of interactions and contributions of the plurality of data sources.

10. The method of claim 1, wherein analyzing content includes transcribing relevant information from the content of the plurality of data sources.

11. A system for providing reasonable language model learning in a computing environment, comprising:
one or more computers with executable instructions that when executed cause the system to:
analyze content from a plurality of data sources and a plurality of triples from a knowledge graph;
generate training data having a plurality of candidate labels derived from the analyzed content, each candidate label associated with a corresponding triple of the plurality of triples from the knowledge graph, the association of a first candidate label with a first triple based on semantic similarity between content from of a first data source and a keyword from the first triple;
train, by a convex continuous relation model, one or more reasonable language models based on the training data; and
generate text data by the trained reasonable language models using the plurality of triples.

12. The system of claim 11, wherein generating the training data further includes creating a set of keywords from a list of the plurality of triples.

13. The system of claim 11, wherein generating the training data further includes identifying the plurality of candidate labels matching a set of keywords from a list of the plurality of triples by searching the plurality of data sources using an informational retrieval operation.

14. The system of claim 11, wherein the executable instructions when executed cause the system to:
identify the semantic similarity between the data in the first data source and the first triple from the knowledge graph; and
associate the first candidate label with the first triple based on the semantic similarity.

15. The system of claim 11, the executable instructions further causing the system to:
merge the analyzed content of the plurality of data sources into a database including a timestamped record of interactions and contributions of the plurality of data sources.

16. The system of claim 11, wherein analyzing content includes transcribing relevant information from the content of the plurality of data sources.

17. A computer program product for increasing trustworthiness of an accelerator in heterogenous systems in a computing environment, the computer program product comprising:
one or more computer readable storage media, and program instructions collectively stored on the one or more computer readable storage media, the program instruction comprising:
program instructions to analyze content from a plurality of data sources and a plurality of triples from a knowledge graph;
program instructions to generate training data having a plurality of candidate labels derived from the analyzed content, each candidate label associated with a corresponding triple of the plurality of triples from the knowledge graph, the association of a first candidate label with a first triple based on semantic similarity between content from of a first data source and a keyword from the first triple;
program instructions to train, by a convex continuous relation model, one or more reasonable language models based on the training data; and
program instructions to generate text data by the trained reasonable language models using the plurality of triples.

18. The computer program product of claim 17, wherein generating the training data further includes:
creating a set of keywords from a list of the plurality of triples; and
identifying the plurality of candidate labels matching a set of keywords from a list of the plurality of triples by searching the plurality of data sources using an informational retrieval operation.

19. The computer program product of claim 17, further including program instructions to:
identify the semantic similarity between the data in the first data source and the first triple from the knowledge graph; and
associate the first candidate label with the first triple based on the semantic similarity.

20. The computer program product of claim 17, wherein the program instructions further comprise:
program instructions to merge the analyzed content of the plurality of data sources into a database including a timestamped record of interactions and contributions of the plurality of data sources.

* * * * *